(12) United States Patent
Diesel

(10) Patent No.: US 6,417,802 B1
(45) Date of Patent: Jul. 9, 2002

(54) INTEGRATED INERTIAL/GPS NAVIGATION SYSTEM

(75) Inventor: John W. Diesel, Woodland Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 3 days.

(21) Appl. No.: 09/816,798

(22) Filed: Mar. 23, 2001

Related U.S. Application Data

(60) Provisional application No. 60/199,897, filed on Apr. 26, 2000.

(51) Int. Cl.[7] ............................. G01S 5/02; H04B 7/185
(52) U.S. Cl. ................................................. 342/357.14
(58) Field of Search ..................................... 342/357.14

(56) References Cited

U.S. PATENT DOCUMENTS 5,583,774 A  * 12/1996  Diesel ..................... 701/200

* cited by examiner

Primary Examiner—Thomas H. Tarcza
Assistant Examiner—Fred H. Mull
(74) Attorney, Agent, or Firm—Robert E. Malm

(57) ABSTRACT

The invention is a method and apparatus for adjusting the phase and frequency of a received GPS signal in an inertial-GPS navigation system by inputting a delta-phase at delta-time intervals into the received satellite signal. The method comprises the steps of determining two delta-phase components: (a) a Kalman delta-phase component derived from a plurality of candidate Kalman delta-phase components obtained by performing a first set of more than one Kalman filter processes and (b) an IMU delta-phase component derived from the IMU outputs and a direction-cosine matrix that translates the body coordinates of the IMU into the navigation coordinates of the inertial-GPS navigation system.

22 Claims, 2 Drawing Sheets

INTEGRATED INERTIAL/GPS NAVIGATION SYSTEM

CROSS-REFERENCE TO RELATED APPLICATIONS

This application claims the benefit of U.S. Provisional Application No. 60/199,897, filed Apr. 26, 2000.

STATEMENT REGARDING FEDERALLY SPONSORED RESEARCH AND DEVELOPMENT (Not applicable)

BACKGROUND OF the INVENTION

This invention relates generally to integrated inertial/GPS navigation systems and more specifically to integrated inertia/GPS navigation systems that achieve improved operational reliability through the use of a plurality of Kalman filters.

The Autonomous Integrity Monitored Extrapolation (AIME™) algorithm is an improved algorithm for integrating the Global Positioning System (GPS) with an inertial navigation system (INS) in a way that the navigation solution has a minimum susceptibility to equipment failures, interference, and jamming. The principal problem with using Kalman filters to integrate GPS with INS is that a slow GPS failure due to interference or spoofing can contaminate the integrated solution before it is detected. The AIME™ algorithm solves this problem by analyzing the residuals of the filter over long time intervals before the corrections are added externally to the INS solution. Because the solution is based on the continuous INS output, it is extremely reliable, and continuous in case of complete loss of the GPS. By using parallel solutions which are not sensitive to the failure, it rejects the contamination and continues using an uncontaminated, reliable precision navigation solution.

This principle is applied in the present invention to carrier tracking. The basis of the invention is the Anti-Jam AIME™ (AJ-AIME™) algorithm. This algorithm achieves at least 20 dB J/S improvement, and possibly 30–40 dB J/S improvement. This is in addition to the J/S improvements from other techniques. Previous solutions to improve J/S performance are based on deep coupling using a vector solution combining both carrier and code measurements and INS errors. These errors are estimated in a large, complex maximum likelihood estimator. One problem with these approaches is that the signals are no longer independent so that receiver autonomous integrity monitoring (RAIM) cannot be used to determine integrity.

The AJ-AIME™ approach avoids the loss of integrity and possible contamination inherent in such vector approaches. Even if jamming is successful, the AIME™ solution provides maximum accuracy for coasting with the calibrated INS solution, since this solution is uncontaminated from the period when jamming or interference first began.

For manned aircraft or long range missiles already equipped with a high-quality INS, the AIME™ algorithm can be implemented in a separate, very inexpensive small box, which adds corrections to the INS solution. For inexpensive short range missiles, or munitions, without INS, the AIME™ algorithm is combined with MEMS technology. This solution uses 1 deg/hr silicon gyros, 20 micro-g accelerometers, and a GPS receiver, all integrated in an inexpensive, small box.

Without WAAS, the failure detection and exclusion (FDE) availability of RAIM for non-precision approach (NPA) using 24-satellite constellations with up to three outages is less than 50%. Using WAAS for Precision Approach CAT I (DH=200 feet), the FDE availability of RAIM is less than 2%. One objective of this invention is to improve FDE availability by up to five orders of magnitude. RAIM is basically a "snapshot" approach using instantaneous noisy position data. Instead of RAIM, this invention uses an integrated systems approach. With today's system technology, including micro-electro-mechanical system (MEMS) technology, and using Kalman filter algorithms, it is possible with this approach to use feedback from rate, acceleration, acceleration rate, etc., up to at least the fourth derivative of position, in the Kalman filter error model.

In order to reject errors caused by satellite clock failures, multipath, excessive atmospheric errors, or subsystem failures, these errors and all other errors are modeled in a bank of Kalman filters in the AIME™ algorithm. Each of these filters is tuned for excessive errors in one channel, or in one group of channels, or in a subsystem. The filter which models the errors correctly will have uncorrelated residuals, because of the "innovations property" of Kalman filters. By estimating the mean of the residuals over many Kalman filter cycles, a test statistic is obtained for each filter. This statistic is the mean-square estimated residual for that filter. The filter with the correct model will have the lowest test statistic and the output of that filter will be used. The other filters have large mean-square estimated residuals, since they do not correctly model the excessive error.

The word "failure" is used herein to represent any excessive error which can contaminate the solution, whether due to an actual subsystem soft failure or due to a temporary excessive instrument error or signal error.

Recursive algorithms are used in order that the estimate can use very large numbers of Kalman filter cycles to detect slow failures. In present civil applications, these estimates use residuals over the past two hour period to detect and exclude errors due to slow satellite clock drifts. This algorithm has been certified for Primary Means and has been flown on commercial airliners for many years. In addition, many years of data have been collected and analyzed from flights in normal airline operation.

To improve anti-jam performance, other approaches have claimed that 30–40 dB J/S improvement can be achieved by a vector processing algorithm using deep coupling, where the INS is integrated with the measurements from both the carrier and code discriminators. This would be done in a large, complex, maximum-likelihood estimator which attempts to estimate all error sources including INS errors. This approach creates an integrity problem since the different satellite measurements are no longer independent, and RAIM-type integrity checking is no longer valid.

There are three additional difficulties with this approach: (1) it does not consider the fundamental problem that arises when integrating inertial information with carrier phase information, (2) it does not properly consider the unique characteristics of inertial system errors, and (3) it does not consider the very different characteristics of carrier phase errors vs. code errors.

The fundamental problem referred to in (1) above is that the wavelength of the carrier is only 19 centimeters. During turbulence or high dynamics, the separation between the INS and the GPS antenna makes it difficult to process changing inertial attitude information fast enough to aid the carrier tracking at the antenna to centimeter accuracy at 1000 Hz without excessive time lags.

The unique characteristics of inertial systems referred to in (2) above arise because inertial errors vary slowly. Gyro and accelerometer errors change at only a fraction of a micro-g per second. This causes phase errors of only a few micrometers per second. This is too small to estimate with short term phase measurements, which are noisy. It is much better to estimate these errors over long periods of time using PR measurements, which have bounded position errors over these long periods.

The difficulty identified in (3) above arises because pseudorange measurements are made at 1 Hz with an accuracy of meters while the carrier phase is measured at 1000 Hz with an accuracy of a centimeter or less. It is not practical to combine these measurements in the same Kalman filter. If they are combined, it is almost impossible to prevent contamination from individual signals.

The solution to (1) above (i.e. aiding the carrier discriminators in turbulence and dynamics) is to use strapdown measurements in body axes at 400 to 1600 Hz to compute the antenna position relative to the INS. These measurements are used to estimate antenna position a short time in the future at 1000 Hz. The short prediction time is adjusted to cancel time lags in the system. This effectively eliminates the dynamic stress that the carrier loop has to track.

The solution to (2) above (i.e. inertial characteristics) is to use only pseudorange information in a navigation Kalman filter with a large step size, such as 20 seconds or more, to estimate INS errors. These estimated corrections are added to the INS solution to obtain the 1000 Hz extrapolator aiding information for the carrier discriminators.

The solution to (3) above (i.e. carrier vs. code characteristics) is to use a separate AJ-AIME™ Kalman filter for the carrier discriminator information. This Kalman filter has a much smaller update frequency of 1 Hz., to estimate slow corrections to the 1000-Hz phase discriminator data. The inertial extrapolator has already eliminated the dynamics from the measurements, and the navigation Kalman filter has eliminated slowly varying errors, such as user clock errors, atmospheric errors, and IMU instrument errors. The 1-Hz AJ-AIME™ Kalman filter will only have to correct small, residual medium-frequency errors in the carrier tracking loop. This 1-Hz carrier loop filter will also use parallel banks of similar Kalman filters with residuals averaged over short and long periods to detect and reject phase error contamination.

Measurements for different satellites are no longer independent at the same update cycle, but this was never a requirement for AIME™ integrity as it is for RAIM integrity. In fact, the AIME™ residuals are highly correlated at each Kalman measurement cycle, but they are uncorrelated from one cycle to the next, provided there is no failure, and the model is correct.

In military applications, the AIME™ navigation Kalman filter cycle time can be reduced from 60 seconds, as used in civil applications, to 20 seconds. This navigation Kalman filter is then used to aid a second ANTI-JAM AIME™ (AJ-AIME™) Kalman filter with cycle time of only one second. This filter in turn aids an inertial extrapolator, operating at 1000 Hz., which is used to eliminate the high frequency dynamics from the carrier tracking loop. This provides J/S improvement of 30–40 dB. The objective is to reject multipath, unintentional anomalies or interference, jamming, and spoofing, and to continue carrier tracking for more than a minute with complete loss of the GPS signal, as caused by masking due to aircraft or missile motion.

Definitions of symbols used herein are as follows.
$A_x, A_y, A_z$ Non-gravitational accelerations along navigation axes
ADIRS Air Data Inertial Reference System
AHRS Attitude and heading reference system
AIME™ Autonomous integrity monitored extrapolation
AJ-AIME™ Anti-Jam autonomous integrity monitored extrapolation
$[C^R_B]$ Direction cosine matrix from Body to navigation Reference axes
CAT I Category of precision approach with 200 foot decision height
DGPS Differential Global Positioning System
DH Decision height for approach to landing
FDE Failure detection and exclusion
FOM Figure of Merit
HDOP Horizontal Dilution of Precision
HIL Horizontal integrity level
HPL Horizontal protection level
IMU Inertial measurement unit
INS Inertial navigation system
IRS Inertial reference system
J/S Ratio of jamming power to signal power, usually measured in dB
MEMS Micro-electro-mechanical system
NPA Non precision approach
OCS Operational Control Segment
PR Pseudo Range measurement from GPS
R Earth radius
$R_L^B$ Lever arm from IMU to GPS antenna in body axes
RAIM Receiver autonomous integrity monitoring
SA Selective Availability
VDLL Vector delay lock loop
VPL Vertical protection level
WAAS Wide Area Augmentation System
deg/hr angular rate unit of degrees per hour
g unit of acceleration equal to 32.2 feet/second$^2$
$\omega$ Total spatial angular rate of navigation coordinates (earth rate+craft rate)
$\tau$ Correlation time of first order Markov process
Definitions of Kalman filter symbols used herein are as follows.
KF Kalman filter
k Index of Kalman filter cycle, or navigation solution cycle
M,N Dimension of measurement vector, error state vector, resp.
$r_k$ Residual vector of Kalman filter, dimension (M×1)
$V_k$ Covariance matrix of residuals, dimension (M×M)
$r_{est}$ Estimated mean residual vector of Kalman filter, dimension (M×1)
$V_{est}$ Covariance matrix of estimated mean residual vector, dimension (M×M)
$s_{est}^2$ Test statistic
$z_k$ Measurement vector of Kalman filter
$H_k$, F Observation matrix (M×N), dynamics matrix N×N), resp.
$x_k^-$, $x_k^+$ Error state vector before, and after, update, resp., dimension (N×1)
$R_k$, $Q_k$ Measurement noise (M×M), Process noise N×N), resp.
$P_k^-$, $P_{k+}$ Error state Covariance matrix before, and after update, dimension (N×N)
$K_k$ Kalman gain matrix, dimension (N×M)
T Superscript indicating transpose of matrix
−1 Superscript indicating inverse of matrix
$z_i(t)$ Measurement from $i^{th}$ satellite at time t
$x_z(t)$ Temporary error state used to make measurement at time t
$PR_{ic}(x_z(t))$ Pseudorange computed from error state $x_z(t)$
$PR_{im}(t)$ Pseudorange measured at time t $\Phi(t-t_k)$ Transition matrix from time $t_k$ to time $t$
$e\phi_{ic}(x_c(t))$ Computed phase errors at time t
$e\phi_{im}(t)$ Measured phase errors at time t

BRIEF SUMMARY OF THE INVENTION

The invention is a method and apparatus for adjusting the phase and frequency of a received GPS signal in an inertial-GPS navigation system comprising an inertial measurement unit (IMU) and a GPS receiver where the GPS receiver is postulated as having an input port for inputting a delta-phase at delta-time intervals into a received satellite signal and an output port for outputting a carrier phase error defined as the difference between the actual phase of the received GPS signal and a reference value. The GPS receiver is also postulated as having an output port for outputting a pseudorange associated with the received GPS signal. The IMU is postulated as having an output port for outputting the acceleration and angular velocity of the IMU.

The method comprises the steps of determining two delta-phase components: (a) a Kalman delta-phase component and (b) an IMU delta-phase component. The Kalman delta-phase component is derived from a plurality of candidate Kalman delta-phase components obtained by performing a first set of more than one Kalman filter processes. The inputs to each first-set Kalman filter process include the carrier phase error and a position vector associated with the IMU. A candidate Kalman delta-phase component is produced as an output of each first-set Kalman filter process. The Kalman delta-phase component is determined from a candidate Kalman delta-phase components selected from the plurality of candidate Kalman delta-phase components by applying a predetermined Kalman delta-phase component selection rule.

The IMU delta-phase component is derived from the IMU outputs and a direction-cosine matrix that translates the body coordinates of the IMU into the navigation coordinates of the inertial-GPS navigation system.

DETAILED DESCRIPTION OF THE INVENTION

Figure 1:
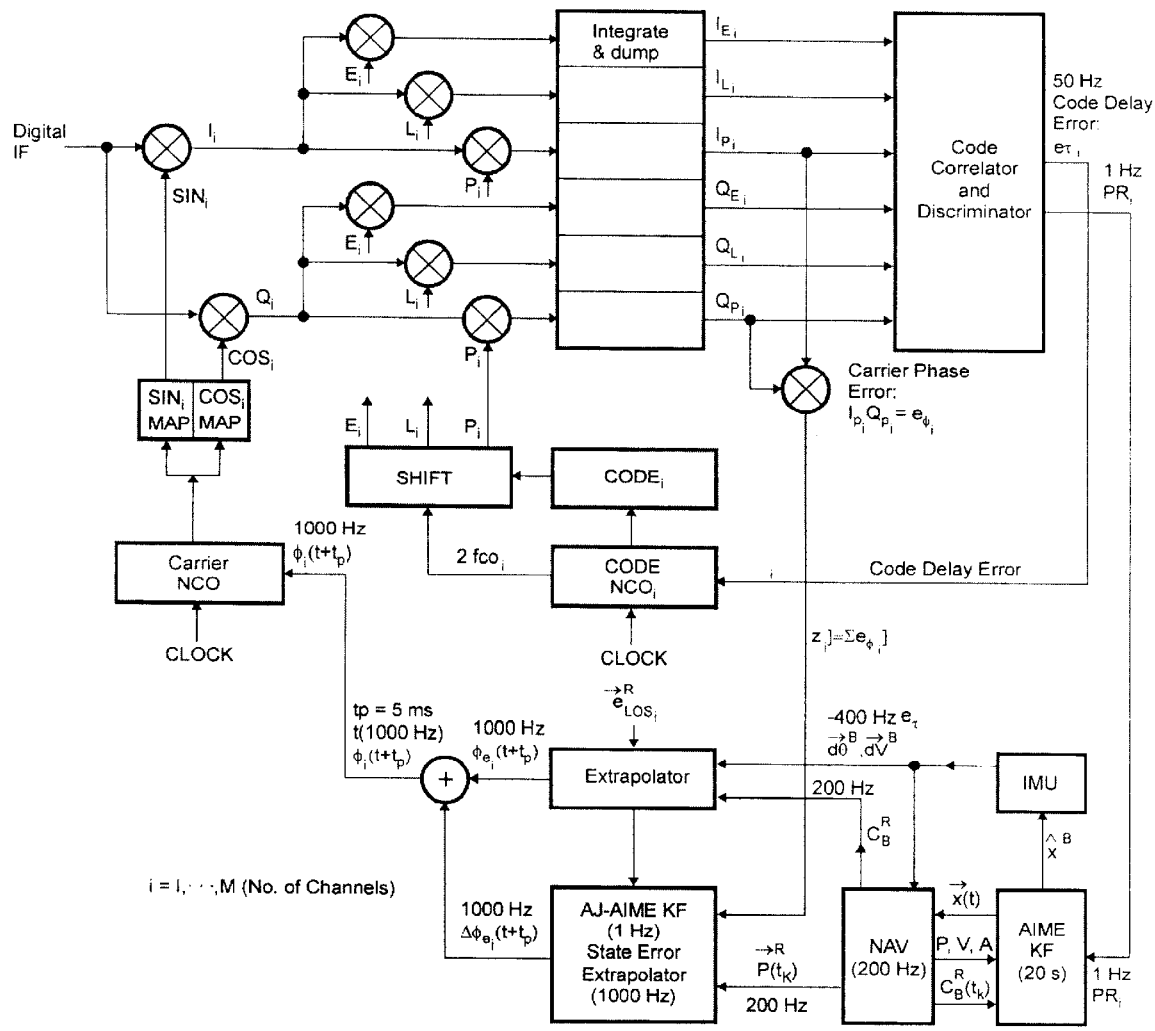
FIG. 1 shows an embodiment of the invention in the context of a GPS receiver and an IMU.

The AIME™ invention described herein applies to both the AIME™ navigation Kalman filter (KF), and to the AJ-AIME™ carrier-loop Kalman filter (KF). The AIME™ navigation KF has been used by itself in the past for navigation of commercial airliners. Details of this filter can be found in U.S. Pat. No. 5,583,774 which is incorporated herein by reference.

In a typical application to prevent jamming, the AIME™ navigation KF is used both for navigation and to aid the AJ-AIME™ carrier-loop KF. The AIME™ navigation KF typically operates at Kalman update rates of 1 cycle per minute when using 0.01 deg/hr inertial grade gyros and 3 cycles per minute or higher when using 0.1 deg/hr to 1 deg/hr attitude and heading reference system (AHRS) grade gyros. The AJ-AIME™ carrier-loop KF typically operates at a Kalman update rate of 1 Hz. The AIME™ navigation KF estimates low-frequency error states with correlation times of more than 5 minutes. The AJ-AIME™ carrier-loop KF estimates medium-frequency errors with correlation times of 5 minutes or less. Much-higher-frequency errors are caused by aircraft dynamics. These dynamic errors are corrected by an inertial extrapolator which operates at 1000 Hz. The extrapolator uses IMU measurements at 200 Hz to 1600 Hz.

The AIME™ algorithm applies to the AIME™ navigation KF and the AJ-AIME™ carrier-loop KF separately. In each KF, the algorithm is used to detect and exclude excessive errors in the frequency range of its model and to exclude contamination or spoofing. This makes carrier tracking less vulnerable to interference, jamming, or spoofing, and less vulnerable to temporary loss of the GPS signal caused by masking due to aircraft angular motion.

The equations for the test statistic used in the AIME™ algorithm are based on the optimal estimation of a hypothesized true residual, based on observations of the measured residual over many Kalman filter cycles. This is the essence of the invention.

It is assumed that the individual Kalman filter residuals are independent measurements of the true residual. They differ from the true residual because of measurement noise, which is the innovation in the Kalman filter caused by process noise and GPS measurement noise. The sequence of these measurement residuals over a long time period is used to estimate the true residual. This sequence is the innovations sequence of the Kalman filter.

AIME™ detects and identifies failures by estimating the mean of the residuals in the Kalman filter over various time intervals. If the Kalman filter model is correct (no failures), the residuals are uncorrelated over time (innovations principle) and the mean of the residuals is zero. The estimate of the mean approaches zero as longer time intervals, represented by more Kalman filter cycles, are used in the estimate.

Large failures can be detected quickly by estimating the mean residual over a few cycles. Slow failures are the most difficult to detect. The more Kalman filter cycles used in estimating the mean residual, the smaller the failure that can be detected, without excessive false alarms. This invention includes a recursive algorithm which makes it possible to use an extremely large number of Kalman filter cycles in the estimate of the mean residual without excessive use of computer memory or processing capacity. In the preferred embodiment described below, 120 Kalman filter cycles are used. However, 256, 1024, or an even greater number of cycles could be used, thereby making it practically impossible for an adversary or terrorist to "spoof" the system.

In addition to using the increased number of cycles to increase the averaging time used in the estimate, it is used to reduce the Kalman filter update interval. A smaller update interval is desirable, in order to improve the performance when IMU instrument errors are larger than normal.

The recursive algorithm computes the estimated residual over various time intervals by adding single terms to running sums. The individual terms, indexed by subscript "k", are separated into sub-groups of several Kalman filter cycles each. Because of the associative law of addition, the sums for each sub-group can be determined first, and then the sums for the sub-groups can be summed to determine the sum for the total. The total sum is formed by starting with the first subgroup sum, and adding one new term at a time to a running sum of sub-group sums, as explained in the preferred embodiment.

If a failure occurs, the Kalman filter model is incorrect, and the residuals of the Kalman filter are no longer uncorrelated from one cycle to the next. In this case, the failure detection statistic is non-central Chi-square distributed, and it exceeds a threshold, which can be computed for a maximum missed-detection probability.

Isolation is accomplished by using a bank of parallel hypothesis test Kalman filters, each tuned for a different failure. There is a separate filter for each satellite failure or group of satellite failures, for satellite clock failures, for IMU instrument failures, for GPS user clock failures, for altimeter failures, or for the onset of jamming. Each of these filters saves its residuals over long time intervals.

Navigation can continue despite IMU or altimeter soft failures, by using a solution returned for large IMU errors, or large altimeter errors, respectively. The same is true for large GPS user clock errors. If cost permits, redundant systems can also be used even in the event of hard failures. Redundant IMUs, altimeters, and GPS receivers are typically used in commercial airliner applications.

When there is a failure, as detected by the single Kalman filter which is modeled for no failures, the corresponding long term residuals of the different failure hypothesis test filters are analyzed. The test filter which is modeled for the particular failure will still have small, uncorrelated residuals over the entire interval, and a small test statistic. All the other test filters will have correlated residuals and large test statistics.

The squared estimated mean residual is transformed and normalized. This is done by using the inverse of the covariance matrix $V_{est}$ of the estimated mean residual $r^{est}$ to form a statistic $s_{est}^2$. If there are no failures, the mean of the residuals is zero, and the statistic $s_{est}^2$ is central Chi-square distributed. If there are failures, the mean of the residuals is non-zero, and the statistic $s_{est}^2$ is non-central Chi-square distributed.

In both civil and military applications, invulnerability to intentional jamming is highly desirable. The objective is 30–40 dB J/S improvement. The AJ-AIME™ algorithm differs from a vector delay lock loop (VDLL) approach or other deep integration approaches using all measurements to aid each tracking loop in coupled signal-tracking channels. These approaches use large, complex, maximum-likelihood estimation techniques to calibrate carrier, code, and IMU errors all in the same filter. As a result, the signals are no longer independent, and integrity algorithms such as RAIM cannot be used to determine interference or spoofing. In addition, individual signal lock is difficult to detect. Because of the dynamic stress in high performance weapons systems, effective bandwidths are still too wide to provide significant J/S improvement.

The AJ-AIME™ approach solves this last problem by using in-flight calibrated delta-theta, delta-V IMU measurements in body axes to predict both body linear and angular position at a high rate. This makes it possible to extrapolate antenna position ahead of real time at 1000 Hz in navigation axes. The position is then resolved along line-of-sight to each satellite to obtain carrier phase and frequency for generating phase rotation for Doppler removal in each channel ahead of real time. It will be shown that this makes the system relatively unaffected by extremely high rates of change of linear or angular acceleration, commonly called "jerk". In effect, the high-frequency dynamics called "stress" is removed before the tracking loop is closed.

Since the bandwidth of the carrier tracking loops is normally determined by the high frequency dynamics, the bandwidth is now determined only by additional residual errors. These residual errors are changes in user clock frequency, changes in atmospheric delays, multipath changes, and gravity anomaly changes. Additional slow corrections for these changes are estimated by the outputs from one of a bank of high frequency (1 Hz.) Kalman filters. The filter output used is the filter which most closely models the errors. The measurements to these filters are the average carrier phase error, after the high frequency dynamics, user clock errors, multipath errors, and atmospheric errors have already been removed or estimated.

Instead of using the Costas filter, the loop is closed by the extrapolator, together with these small Kalman filter corrections. Each of these parallel Kalman filters is tuned for a different excessive contamination effect. The particular output used is the one with the minimum AIME™ test statistic. The Kalman filter with the best model has uncorrelated residuals. This is the "innovations property" of Kalman filters. The uncorrelated residuals result in the minimum test statistic. In effect, the AIME™ algorithm uses adaptive Kalman filter principles, but with no time lag. This not only solves the integrity problem, but makes it almost impossible to spoof. The spoofer would have to modify each signal to correspond to the effect on every channel of a small change in user clock frequency, an IMU sensor error, a small multipath error, or an atmospheric error. Each simulated error would be too small to drag the solution off.

These high-frequency (1 Hz) AJ-AIME™ carrier-loop Kalman filters are aided by one of a bank of low frequency (1 to 3 cycles per minute) AIME™ navigation Kalman filters. These AIME™ navigation filters use pre-filtered 1-Hz GPS PR measurements to estimate the low frequency or slow "DC" errors, such as navigation axis misalignments, gyro and accelerometer bias errors, low-frequency user clock and frequency errors, and slow atmospheric offsets for each satellite. IMU instrument misalignments are stable, and they can be calibrated at the factory to an accuracy of 1 arc second, so that they do not have to be re-estimated by the navigation filter.

Because of the IMU, the response to real dynamic motion is almost instantaneous. However, the Kalman filters act as low pass filters to GPS signal errors. The time constants of these AIME™ Kalman filters is at least 1 minute using 1 deg/hr gyros, and at least 5 minutes, using 0.1 deg/hr gyros. The time constants of conventional carrier-tracking loops is 8 milliseconds for a low-dynamics civil-aviation 20-Hz loop, and approximately 3 milliseconds for a military-aviation 50-Hz loop. It is concluded that J/S improvement is 30 to 40 dB, compared to a 20-Hz conventional carrier-tracking loop when AIME™ uses 0.1 deg/hr gyros or compared to a 50-Hz tracking loop, when AIME™ uses 1 deg/hr gyros.

The equations for the estimated residual $r_{est}$, its covariance $V_{est}$, and its normalized sum-squared statistic $s_{est}^2$ are given below.

The measurement residual $r_k$ and its covariance $V_k$ at each Kalman filter cycle k is given by $$r_k = z_k - H_k x_k^- \quad (1.1)$$

and $$V_k = H_k P_k^- H_k^- + R_k \quad (1.2)$$

The inverse of the covariance matrix (information matrix) of estimated mean is given by $$V_{est}^{-1} = \Sigma_k V_k^{-1} \text{ (summing over cycles } k=1 \text{ to } k_{max}) \quad (1.3)$$

The sum of weighted residuals is given by $$(V_{est}^{-1}\ r_{est}) = \Sigma V_k^{-1}\ r_k \text{ (summing over cycles } k=1 \text{ to } k_{max}) \quad (1.4)$$

The estimated mean and normalized sum-squared test statistic are given by $$r_{est} = (V_{est}^{-1})^{-1}\ (V_{est}^{-1}\ r_{est}) \quad (1.5)$$

$$s_{est}^2 = r_{est}^T\ V_{est}^{-1}\ r_{est} = r_{est}^T\ (V_{est}^{-1}\ r_{est}) \quad (1.6)$$

The equations are performed in single precision in order to reduce the computer duty cycle requirements and memory requirements. The duty cycle requirements are a result of the many inversions and re-inversions of the covariance matrices of the measurement residuals, which are required whenever the satellites in use are changed, as explained in the next section. The memory requirements result from the many matrix inverses which must be saved for the multiple averaging which is explained in the next sections.

The Kalman filter equations are given below. These equations are similar to those in Gelb, *Applied Optimal Estimation*, TASC, MIT Press, 1974, Table 4.2-1, page 110. The equations are performed in double precision in order that the error state covariance matrix remain positive definite.

The measured difference between computed and measured PR at 1 Hz, for satellite i is given by $$z_i(t) = PR_{ic}(x_z(t)) - PR_{im}(t) \text{ where } x_z(t) = \Phi(t-t_k)x_z(t_k) \quad (2.1C)$$

The measured difference between computed and measured carrier phase is given by $$z_i(t) = e\phi_{ic}(x_z(t)) - e\phi_{im}(t) \text{ where } x_z(t) = \Phi(t-t_k)\ x_z(t_k) \quad (2.1N)$$

The averaged or "pre-filtered" measurement at k is given by $$z_k = (1/T)\ \Sigma_{(t)} z_i(t) \text{ where } t=t_k,\ \ldots,\ t=t_{k+1},\ T=t_{k+1}-t_k \quad (2.2)$$

The Kalman filter update is accomplished using the Kalman filter gain $K_k$, the state estimate update $x_k^+$, and the error covariance update $P_k^+$.

$$K_k = P_k^- H_k^T [H_k\ P_k^-\ H_k^T + R_k]^{-1} \quad (2.3)$$

$$x_k^+ = x_k^- + K_k\ [z_k - H_k\ dx_k^-] \text{ where } dx_k^- = x_k^- - x_z(t_k) \quad (2.4)$$

$$P_k^+ = [I - K_k\ H_k] P_k^{-31} \quad (2.5)$$

Kalman filter propagation is accomplished using the state estimate extrapolation $x_{k+1}^-$ and the error covariance extrapolation $P_{k+}$.

$$x_{k+1}^- = \Phi(k) x_k^+ \quad (2.6)$$

$$P_{k+1} = \Phi_k\ P_k^-\ \Phi_k^T + Qk \quad (2.7)$$

Unlike Gelb, the propagation is done after the update. This is necessary because the updates are done on the error state $x_k^-$ after the measurements $z_k$ are averaged or pre-filtered at 1 Hz between k and k+1, as indicated in Equation (2.2). The Kalman filter updates of $x_k^-$ are actually performed in the background during the interval from k+1 to k+2. In order to begin collecting measurements during this interval, before $x_{k+1}^-$ has been computed, a temporary estimate $x_z(t_{k+1})$ is used to compute the $z_i(t)$ during this interval, as indicated in Equation (2.1). The measurements z(k+1) are then adjusted for the difference $$dx_{k+1}^- = x_{k+1}^- - x_z(t_k+1) \quad (2.8)$$

as indicated in Equation (2.4) with k replacing k+1 at the next cycle.

Modern receivers can accommodate up to 12 satellites in view. With the present constellation of 24 satellites, there are typically an average of 8 of the original 24 satellites in view, and sometimes as few as 6. Spare satellites are of little use in improving geometry, since they are spaced close to one of the original satellites most likely to fail. It is unnecessary to use more than 8 satellites when the geometry is good.

As an extreme example of bad geometry, the line-of-sights to seven of the satellites could all lie in a plane, and the line-of-sight to the eighth satellite could be perpendicular to that plane. The failure of the eighth satellite would be undetectable using only the original eight satellites. If one of the more than eight satellites used was an additional satellite also perpendicular to the plane, the satellite failure would be detectable by using this additional satellite.

When there are more than 8 in view, only 8 satellites with good geometry are used. These 8 satellites are selected by computing the RAIM protection level for the set of 8 satellites. The horizontal protection level (HPL) would be used to select for horizontal accuracy, while the vertical protection level (VPL) would be used for applications like precision approach, where vertical accuracy is critical.

Initially, the first 8 satellites in view are used in the table. As explained previously, the RAIM protection level is used to determine bad geometry. If the 8 satellites used have a computed protection level exceeding the average level with 8 satellites, one of the satellites is replaced by one of the satellites not used, and the RAIM protection level is re-computed with the new set. If the new set of 8 satellites has larger protection level than the previous set of 8, the newer set is used. If there were more than 9 satellites in view, this process is repeated until the specified average protection level is achieved.

The decision must be made on which satellites to replace, when the protection level is too large with the presently selected 8 satellites, and more than 8 satellites are in view. The RAIM protection level is determined by computing the "slope" for each of the satellites. This slope is determined for each of the satellites used, by computing the least squares position error solution. Then the position error and test statistic corresponding to a fixed bias error in that satellite is determined. The slope for that satellite bias error is the ratio of the position error resulting from the fixed bias error to the test statistic resulting from the fixed bias error.

The RAIM protection level is determined from the satellite error which results in the maximum slope, since that is the most difficult-to-detect satellite. This means that when this satellite has a large bias error, it also has the largest position error when the test statistic exceeds the threshold. This implicitly means that it has the least redundancy checking from other satellites. The satellite to be replaced is the satellite with the minimum slope, since this is the most-easy-to-detect satellite. This means it has the most redundancy from other satellites, and can be rejected with little loss of redundancy for integrity checking.

The satellite information is kept in a table, with 8 rows, corresponding to a maximum of 8 satellites used. The rows are filled, one row at a time, as new satellites first come into view. The first column of the table shows the ID Number of the satellite. This column vector is referred to as the "current map". When a satellite goes out of view, the corresponding row is cleared, and a "−1" is used to replace the satellite ID number. If a new satellite replaces the old in this row, the new satellite ID number replaces the old. The other columns in the table contain information on the status of the satellite, such as how long it has been in view.

The two sums $\Sigma_k V_k^{-1}$ and $\Sigma_k V_k^{-1} r_k$ used in the estimated mean in Equations (1.3) and (1.4) respectively are taken over many Kalman filter cycles as explained above. These sums are performed as running sums by starting with the first term, and adding one new term to the running sum at each cycle.

Both the covariance matrix $V_k$ from Equation (1.2) and its inverse $V_k^{-1}$ as used in Equation (1.3) are stored in full 8×8 matrices even though there are missing satellites. The corresponding row and column for a missing satellite, as indicated by the "−1" in the map, are filled with zeroes.

The residual vector $r_k$ in Equation (1.1), the weighted residual vector $V_k^{-1} r_k$, the running sum of weighted residuals $\Sigma_k V_k^{-1} r_k$ in Equation (1.4), and the estimated mean residual rest in Equation (1.5) are each stored in a full 8×1 column matrix, even though the number of satellites used is less than 8. The missing satellites in this matrix are replaced by zeroes corresponding to the "−1" flags from the current map which is also 8×1.

The individual terms, indexed by subscript "k", can be separated into sub-groups of several Kalman filter cycles each. Because of the associative law of addition, the sums for each sub-group can be determined first and then the sums for each sub-group can be summed to determine the sum for the total. The total sum is formed by starting with the first sub-group sum, and adding one new term at a time to a running sum of sub-group sums, as explained in the next section.

The satellites used in a cycle or group are represented by a reference map for that cycle or group. The map for the current Kalman filter measurement is simply the first column of the current satellite table, showing the ID numbers of the satellites used or the "−1" indicating no satellite in that position of the table. The reference map for a group of cycles is adjusted starting with the reference map for the first cycle or sub-group, as explained below When adding a current new term to a running sum, a special procedure, described below, is required when the current term uses a different set of satellites (represented by the current map for that term), from the set of satellites used by the running sum up to that term (represented by the reference map for that running sum).

This map difference could be caused by a satellite going out of view, as determined by a count of the number of consecutive Kalman filter cycles for which the measurement for that satellite is missing. The satellite is assumed to be out of view if this count equals six or more. If less than six, as due to masking during a turn, it is assumed that the satellite is still in use, although its measurement is missing temporarily. In this case, the reference map for the running sum is unchanged in the procedure below. The map difference also could be caused because of a previously used satellite being replaced by a new satellite, or because a new satellite comes into view in an unoccupied position in the table.

These differences may also cause the reference maps for sub-groups to differ. When summing the sums for each subgroup, a similar procedure is required when the new sub-group sum uses a different set of satellites (represented by the current map of that sub-group sum), than that used by the running sum of sub-group sums up to that point (represented by the reference map of that running sum of subgroup sums).

When the maps differ, the running sums must be modified to correspond to the satellites used in the new term before adding the new term. Since the sums in Equations (1.3) and (1.4) represent information matrices, and weighted residuals, with zero rows and columns for missing is satellites, it is not clear how to modify the running sums before adding the new term.

The answer is to first compress the 8×8 information matrix and the running sum of weighted residuals to compact matrices with no zeroed rows or columns. The dimensions are determined by the number of measurements used in the running sums at this point before adding the new term. Since there are no zeroed rows and columns in the compressed information matrix, it can be inverted to obtain the corresponding covariance matrix called $V_{avg}$. This is the covariance matrix of the estimated residual $r_{avg}$ based on the measurements up to that point in the running sum.

The estimated residual $r_{avg}$ up to that point can also be computed as $r_{est}$ from Equation 1.5) since $$(V_{est}^{-1})^{-1} = V_{avg}$$

$$r_{est} = (V_{est}^{-1})^{-1}(V_{est}^{-1} r_{est})$$

and since the weighted sum of residuals is available as the running sum from Equation (1.3). The row and column for the satellite not used in the new term, represented by the current map, are then deleted from this covariance matrix and residual, to reduce the dimension by one. As explained, the reference map for the running sums is modified to replace the deleted satellite ID's by "−1", if the satellite has been missing for three or more Kalman cycles at 1 cycle per minute.

The covariance matrix is then inverted back to the information matrix with the satellites deleted. It is then uncompressed to an 8×8 by adding back in the rows and columns of zeroes. The running sum of weighted residuals with the satellites deleted can then be re-computed using Equation (1.4) to compute the right side from the left side:

$$\Sigma_k V_k^{-1} r_k = (V_{est}^{-1} r_{est})$$

The new terms can now be added to the running sums. If the new terms contain rows and columns for new satellites, these are added to the rows and columns of zeroes in those positions. The map with the new satellites replaces the reference map for the running sums.

As explained in the previous section, the terms in the sums in Equations (1.3) and (1.4) can be computed by separating the total group of terms into sub-groups of several cycles each. The sums for each sub-group are computed first, and then the sums for each sub-group can be summed to determine the sum for the total group. There are two ways of doing this. The first is called "buffered averaging". The second is called "sampled averaging". These methods are described below.

In buffered averaging, the terms for each Kalman filter cycle are added to a running sum until a maximum number of cycles is reached. This maximum number of cycles is different for the navigation AIME™ Kalman filter than it is for the carrier loop AJ-AIME™ Kalman filter. For the navigation filter there are also different maximum numbers depending on the cycle rate, which in turn depends on the gyro grade used.

For civilian navigation grade gyros of 0.01 deg/hr, with Kalman update cycle rate of 1 cycle per minute, the maximum number accumulated is 10 representing ten minutes of averaging per buffer cycle. For the military 0.1 to 1.0 deg/hr grade gyro, the Kalman update cycle rate is 3 cycles/minute.

The maximum number per buffer cycle is 6, representing two minutes of averaging. For the carrier loop AJ-AIME™ filter, whether civilian or military, the maximum number per buffer cycle is 10, representing ten seconds of averaging.

In any of the three cases, the accumulated totals are then stored in one position of a circular buffer with 12 buffer cycle positions. When 12 sub-group sums have been accumulated, the next subgroup sun replaces the first sub-group sum stored. Similarly, the next sub-group sum replaces the original second sub-group sum stored previously. In this way, the buffer stores the sub-group sums until 12 sums are accumulated and thereafter stores only the last 12 sub-group sums.

This process is repeated, with a pointer keeping track of the most recent position stored. This pointer counts from 1 to 12, when it is reset to 0, since 12=0 (MOD 12). In this way the buffer always stores the most recent 12 buffer cycles. When each new buffer sub-group sum is stored, the last 12 sub-group sums are summed over the past 12 buffer cycles according to Equations (1.3), and (1.4) where the k subscript now corresponds to each buffer cycle sub-group sum of 10 Kalman filter cycles at 1 cycle per minute or 6 cycles at 3 cycles per minute or 10 cycles at 1 cycle per second.

The estimated mean residuals and corresponding test statistic are computed from Equations (1.5) and (1.6) for the accumulated sub-group sums until the buffer is full and thereafter the estimated mean residuals and corresponding test statistic are computed for the past 12 buffer cycles. Similarly, the estimated mean residuals and corresponding test statistic are also or computed until 4 buffer cycles are accumulated and thereafter for the last 4 buffer cycles.

For the 0.01 deg/hr grade gyro navigation filter, when the buffer is full, it corresponds to 12×10=120 Kalman filter cycles. At one minute per cycle, this is a total averaging time of 120 minutes (two hours). The 4 cycle buffer average corresponds to a total averaging time of 40 minutes. The four cycle buffer average is intended to more quickly detect drifts which are not quite as slow as those detected by the 12 cycle buffer.

As an example, a drift of 0.02 m/s will cause a range error in that satellite of 144 meters after 120 minutes (7200 seconds). Such a drift is extremely rare, and is normally corrected by the Operational Control Segment (OCS). Even with selective availability (SA) on, this 144 meters is a 6-sigma error, assuming a 24-meter one-sigma error from SA, after pre-filtering for 1 minute. This 6-sigma error would be detected with very high probability. The position error is less than HDOP×144 meters. Assuming a bad HDOP of 3, the maximum position error is only 432 meters, which is less than the 556 meter (0.3 nm) alert limit for non-precision approach (NPA). With the low-pass filtering due to the long Kalman filter time constant, the position error will be reduced even further.

The test statistic for this buffer is only computed every ten minutes, assuming a navigation Kalman filter interval of 1 minute. Therefore, this test statistic is used only to detect the slowest satellite drifts of 0.3 m/s or less. A drift of 0.3 m/s causes a range error in the satellite of 180 meters in one buffer cycle sub-group of ten Kalman filter cycles (600 seconds). This drift will be detected in less than ten minutes since it is a 7.5 sigma error. Even with a bad HDOP of 3, this drift will be detected long before the position error approaches 540 meters (3×180 meters). The low-pass filter effect will reduce this maximum error to a fraction of 540 meters.

Faster drifts of 0.3 m/s or higher are detected by sampled averaging, which will now be described. In sampled averaging, there will be three levels of averaging.

The first-level quantities $V_1$, $Vr_1$, $\Sigma V_1$, and $\Sigma Vr_1$ are defined as follows:

$$V_1 = V_k^{-1}; \quad Vr_1 = V_k^{-1} r_k$$

$$\Sigma V_1 = \Sigma_k V_k^{-1}; \quad \Sigma Vr_1 = \Sigma_k V_k^{-1} r_k$$

Map $V_1$=map $V^{-1}(k)$ (current map)

(As explained in previous section on modifications required when satellites are changed: If Map $V_1$=Refmap$_1$, due to a new satellite which is new, changed, or missing—compress and decompress $\Sigma V_1$, $\Sigma Vr_1$ to omit old satellite from slot for new satellites, and change Refmap$_1$=Map $V_1$ if satellite is missing for three or more cycles.)

The first-level quantities are initialized as follows:

$$k_1=0, \Sigma V_1=0, \Sigma V_{r1}=0, \text{Refmap}_1=\text{Map}V_1$$

The index $k_1$ is incremented and the quantities $V_1$ and $Vr_1$ are incrementally summed at each Kalman filter cycle until $k_1$ reaches a maximum count of $k_{1max}$:

$$k_1=k_1+1$$

$$\Sigma V_1=V_1+\Sigma V_1$$

$$\Sigma Vr_1=Vr_1+\Sigma Vr_1$$

When $k_1=k_{1max}$, the following operations are performed:

$$V_2=\Sigma V_1, Vr_2=\Sigma Vr_1, \text{ and Map } V_2=\text{Refmap}_1$$

$$k_1=0, \Sigma V_1=0, \text{ and } \Sigma Vr_1=0.$$

The second-level quantities are initialized as follows:

$$k_2=0, \Sigma V_2=0, \Sigma Vr_2=0, \text{Refmap}_2=\text{Map } V_2$$

(As explained in the previous section on modifications required when satellites are changed: If Map $V_2$!=Refmap$_2$, due to a new satellite which is new, changed, or missing—compress and decompress $\Sigma V_2$, $\Sigma Vr_2$, to omit old satellite from slot for new satellites, and change Refmap$_2$=Map$V_2$.)

The index $k_2$ is incremented and the quantities $V_2$ and $Vr_2$ are incrementally summed at each Kalman filter cycle until $k_2$ reaches a maximum count of $k_{2max}$:

$$k_2=k_2+1$$

$$\Sigma V_2=V_2+\Sigma V_2$$

$$\Sigma Vr_2=Vr_2+\Sigma Vr_2$$

When $k_2=k_{2max}$, the following operations are performed:

$$V_3=\Sigma V_2, Vr_3=\Sigma Vr_2, \text{ and Map}V_3=\text{Refmap}_2.$$

$k_2=0$, $\Sigma V_2=0$, and $\Sigma Vr_2=0$.

The third-level quantities are initialized as follows:

$$k_3=0, \Sigma V_3=0, \Sigma Vr_3=0, \text{Refmap}_3=\text{Map}V_3$$

(If Map$V_3$!=Refmap$_3$, due to a new satellite which is new, changed, or missing, compress and decompress $\Sigma V_3$, $\Sigma Vr_3$, to omit old satellite from slot for new satellites, and change Refmap$_3$=Map$V_3$.)

The index $k_3$ is incremented and the quantities $V_3$ and $Vr_3$ are incrementally summed at each Kalman filter cycle until $k_3$ reaches a maximum count of $k_{3max}$:

$$k_3=k_3+1$$

$$\Sigma V_3=V_3+\Sigma V_3$$

$$\Sigma Vr_3=Vr_3+\Sigma Vr_3$$

When $k_3=k_{3max}$, the following operations are performed:

$$V_4=\Sigma V_3, Vr_4=\Sigma Vr_3, \text{ and } MapV_4=Refmap_3.$$

$$k_3=0, \Sigma V_3=0, \text{ and } \Sigma Vr_3=0$$

As indicated below, the test statistic is computed as each new term is added after the first term in Equations (1.3) and (1.4). This is done to increase the likelihood of detection before the maximum number of cycles $k_{1max}$ is accumulated. To indicate that the sums and test statistic for the next higher level are being accumulated, a subscript index "n" for the next higher level, followed by subscript "e" is used to indicate extrapolation.

The first level s-square equations are:

$$V_{2e}=V_1+\Sigma V_1$$

$$Vr_{2e}=Vr_1+\Sigma Vr_1$$

$$r_{2e}=V_{2e}^{-1}Vr_{2e}$$

$$s_{2e}^2 = r_{2e}^T Vr_{2e}$$

The second level s-square equations are:

$$V_{3e}=V_2+\Sigma V_2$$

$$Vr_{3e}=Vr_2+\Sigma Vr_2$$

$$r_{3e}=V_{3e}^{-1}Vr_{3e}$$

$$s_{3e}^2=r_{3e}^T Vr_{3e}$$

The third level s-square equations are:

$$V_{4e}=V_3+\Sigma V_3$$

$$Vr_{4e}=Vr_3+\Sigma Vr_3$$

$$r_{4e}=V_{4e}^{-1}Vr_{4e}$$

$$\text{-}s_{4e}^2=r_{4e}^T Vr_{4e}$$

When the number of cycles reaches $k_{1max}$, the counter $k_1$ is reset to zero, and the accumulated sums are stored as the first sub-group sum of the second level of averaging. The sums at the first level of averaging are then cleared to zero, and the first level averaging process is repeated.

The terms of sub-group sums are summed at each second level cycle whenever $k_1$ reaches $k_{1max}$. The second level counter $k_2$ is then incremented at each second level cycle until it reaches a count of $k_{2max}$. The test statistic is computed as each new sub-group sum is added, after the first term in Equations (1.3) and (1.4). This is done to increase the likelihood of detection before the maximum number of cycles $k_{2max}$ is accumulated. When the number of cycles reaches $k_{2max}$, the counter $k_2$ is reset to zero, and the accumulated second level sums are stored as the first sub-group sum of the third level of averaging. The sums at the second level of averaging are then cleared to zero, and the second level averaging process is repeated.

The terms of second level sub-group sums are summed at each third level cycle whenever $k_2$ reaches $k_{2max}$. The third level counter $k_3$ is then incremented at each third level cycle until it reaches a count of $k_{3max}$. The test statistic is computed as each new third level sub-group sum after the first term is added in Equations (1.3) and (1.4). This is done to increase the likelihood of a detection before the maximum number of cycles $k_{3max}$ is accumulated. When the number of cycles reaches $k_{3max}$, the counter $k_3$ is reset to zero, and the accumulated sums are stored as the final sub-group sum of the third level of averaging. The sums at the third level of averaging are then cleared to zero, and the third level averaging process is repeated In the preferred embodiment, the maximum counts at each level are:

$$k_{1max}=2,$$

$$k_{2max}=2,$$

$$k_{3max}=2$$

With these maximum counts, the test statistic is only computed once as the second new term is added after the first term in Equations (1.3) and (1.4). This means the first level will accumulate Kalman filter cycles for two minutes, the second level will accumulate two minute sub-groups sums for four minutes, and the third level will accumulate four minute sub-group sums for 8 minutes.

The residuals are used to determine test statistics at each Kalman cycle, at each first level average every two cycles, at each second level average every 4 cycles, and at each third level average every 8 cycles. Since these averages are not computed in circular buffers, they are called sampled averages.

As an example for the navigation grade gyros, assuming SA, a satellite drift of 0.3 m/s will cause a range error in that satellite of 144 meters after 8 minutes (480 seconds). Since 144 meters is a 6-sigma error, this drift will be detected in less than 8 minutes. The position error will be a very small fraction of 432 meters (3×144 meters) for HDOP of 3, because of the long Kalman filter time constant low-pass filter effect. Similarly, larger drifts will be detected sooner, with even smaller position errors.

Failures are detected by comparing the $s^2$ statistics with thresholds. When there are no failures in the Kalman filter from which $s^2$ was computed, the statistic $s^2$ is central Chi-square distributed. The detection threshold $s_D^2$ is selected at the tail of the distribution, to result in a low specified false alarm rate when there are no failures.

The statistics computed at 1 Kalman filter cycle, at the sampled averaging sample times, and at the buffered averaging cycle lengths, are shown below.

| Test Stat. | Kalman Filter Cycle Rate | | | Description |
|---|---|---|---|---|
| | 1/min | 3/min | 1 Hz | |
| | Averaging time | | | |
| $s_1^2$ | 1 minute | 1/3 min | 1 sec | Computed each Kalman filter cycle |
| $s_2^2$ | 2 minute | 2/3 min | 2 sec | Second sampled average, level one $(s_{2e}^2)$ |
| $s_4^2$ | 4 minute | 4/3 min | 4 sec | Second sampled average, level two $(s_{3e}^2)$ |
| $s_8^2$ | 8 minute | 8/3 min | 8 sec | Second sampled average, level three $(s_{4e}^2)$ |
| $s_{B1}^2$ | 10 minute | 2 min | 10 sec | Current one buffer cycle average |
| $s_{B4}^2$ | 40 minute | 8 min | 40 sec | Most recent four buffer cycle average |
| $s_{B12}^2$ | 120 minute | 24 min | 120 sec | Most recent twelve buffer cycle average |

In general, fast failures, such as large step changes or large ramp errors in the satellites, are first detected by the statistics with shortest averaging time. Slow failures are detected by the statistics with the longest averaging times.

In addition to the Kalman filter $f_0$, which is modeled for normal errors with no failures, there is a bank of ten Kalman filters running in parallel, each modeled for a different subsystem failure. These Kalman filters are listed below.

| Filter | Hypothesis | Description of Kalman filter Model |
| --- | --- | --- |
| $f_0$ | No failures | P's, Q's, and R's, from normal error specs |
| $f_1$ | sat 1 failure | P's, Q's, and R's for sat 1 increased |
| $f_2$ | sat 2 failure | P's, Q's, and R's for sat 2 increased |
| $f_3$ | sat 3 failure | P's, Q's, and R's for sat 3 increased |
| $f_4$ | sat 4 failure | P's, Q's, and R's for sat 4 increased |
| $f_5$ | sat 5 failure | P's, Q's, and R's for sat 5 increased |
| $f_6$ | sat 6 failure | P's, Q's, and R's for sat 6 increased |
| $f_7$ | sat 7 failure | P's, Q's, and R's for sat 7 increased |
| $f_8$ | sat 8 failure | P's, Q's, and R's for sat 8 increased |
| $f_9$ | ADIRS failure | P's, Q's, for IRS and Baro increased |
| $f_{10}$ | GPS failure | P's, Q's, and R's for all GPS sats increased (e.g. jamming) |

The first filter, $f_0$ is used to detect, but not isolate, a failure condition in any one of the subsystems. The other filters are used to isolate the failure to a specific subsystem, once a failure condition is detected. In addition to computing the position outputs, each test filter will also compute the two-sigma accuracy figure of merit (FOM), and the horizontal integrity level (HIL), based on its own Kalman filter tuning. When the failure is isolated to a particular subsystem, it is safe to use the outputs from the corresponding test filter, since it is insensitive to that subsystem failure. The outputs from this filter are therefore selected by index fx.

The isolation is achieved by computing statistics as above for each of the Kalman filters in the above table. When a failure occurs, only one of the test filters will continue to have small, uncorrelated residuals, and correspondingly small test statistics. This is the filter which is tuned for that specific subsystem failure. The failure is assumed to have occurred in the subsystem with the smallest test filter statistics at the maximum averaging times where the corresponding detection threshold is exceeded. Since this filter is insensitive to failures in that subsystem, it is safe to use the position solution from this test filter.

The P's in the description column of the above table are the covariances that the Kalman filter is initialized with. These are generally diagonal terms corresponding to the manufacturer's specifications on the error variance. The only off-diagonal terms are those due to correlations of some of the inertial error states at the end of a short alignment since the Kalman filter is initialized at the end of a short alignment.

For the satellites, the diagonal element corresponding to that satellite range bias error state is initialized or re-initialized when the satellite first comes into view. All other elements in the corresponding row and column are initialized with zeroes, since the satellite error is initially uncorrelated with any of the other error states.

For satellite failure test filters $f_1$ through $f_8$, the principal change in the Kalman filter model is to increase the process noise Q for that satellite range bias error state, or carrier phase error, until that satellite measurement is effectively ignored in the updates for that test filter.

For the IMU-Baro failure test filter $f_9$, the process noises Q for all gyro, accelerometer, and baro altitude error states is increased, but not so much that the ADIRS is assumed to be completely unusable. Instead, the Kalman filter $f_9$ gives more weight than normal to the GPS measurements, so that it relies less on IMU-Baro coasting capability. It therefore only models soft failures, since hard failures will shut the system down completely.

When there is a soft IMU-Baro failure, such as a large change in gyro bias error, or a rapid baro-inertial altitude bias change due to a weather front, the residuals and test statistics from this filter will remain small. The test statistics from all of the other filters will be large. A soft failure is therefore assumed to have occurred in the IMU-Baro system. In this case, it is safe to use the position output from this test filter, since it is relatively insensitive to such changes. This is accomplished by using the index, fx, which specifies which filter outputs to use.

When there are large errors in more than one satellite, such as due to the onset of jamming or spoofing, or due to GPS receiver problems, the residuals and test statistics from the GPS failure test filter will remain small. The test statistics from all of the other filters will be large. In this case, it is safe to use the position output from this test filter, since it relies mostly on IRS coasting with only gradual updating from the GPS. The index fx then specified this filter for the outputs. The outputs from this filter can also be used when there is more than one satellite failure at a time or when the statistics from more than one satellite failure test filter are small due to unusual geometry, making it difficult to isolate the bad satellite.

When there is a failure, and it is isolated to a bad subsystem, the failure condition is remodeled in the other test filters, but not to the no-failure test filter $f_0$. This is done so that these other filters will eventually recover from the failure, even though they are contaminated at the time of detection and isolation, as evidenced by their residuals and test statistics being large.

For satellite failures, the failure condition is modeled in all of the other test filters by deleting the failed satellite from the measurements. If the original satellite was excluded incorrectly, the test statistic of the no-failure filter may again give small residuals. If its statistic is less than one half the threshold, the output will again be taken from the no-failure filter, and the previously excluded satellite will again be used by all filters.

Another possibility is that the test statistic for one of the other test filters will become smaller than that for the original test filter, which incorrectly excluded the wrong satellite. This could also occur if two satellites fail at nearly the same time, although this is extremely unlikely. If this occurs, the second satellite is also excluded from all of the other test filters, and the outputs from the second satellite test filter are safe to use.

If the first satellite was incorrectly excluded, its test statistic will again exceed the threshold, and it will again be accepted as a new satellite by the other test filters, which have been excluding both satellites. If the no-failure filter statistic becomes less than one-half the detection threshold, all excluded satellites will be used by all of he test filters.

The failure condition for failure of the IMU-Baro is re-modeled in the other filters by increasing the Q for one of the instruments. The failed instrument is selected by checking which instrument, or instruments, have estimated error state variables which exceed a pre-determined three-sigma limit in the ADIRS failure test filter (or no-failure filter). The state variables checked are the baro-offset, each gyro, and each accelerometer.

The Q selected for increase is thereafter decreased exponentially with a 20 minute time constant in all filters, except in the [MU-Baro failure test filter where all Q's remain large. If the no-failure residuals and test statistic of the no-failure filter eventually become smaller than a two sigma threshold, the outputs are again taken from the no-failure filter rather than from the IMU-Baro failure test filter. This is done because the no-failure filter has only one large Q, which is decaying exponentially, while all the gyro, accelerometer, and baro Q's of the IMU-Baro failure test filter remain large.

FIG. 1 shows how AJ-AIME™ closes the carrier and code tracking loops. The Carrier NCO and CODE $NCO_I$ boxes and the boxes above these boxes in FIG. 1 show the conventional mechanization of a carrier Costas loop and a code delay lock loop except for the conventional filters which close the loop.

The boxes below the Carrier NCO and CODE $NCO_I$ boxes show a Doppler phase rotation increment command $\phi(t+t_p)$ entering the Carrier NCO box. In a conventional Costas loop, this command is the output of a first, second, or third order filter. In FIG. 1 it is the 1000-Hz output of the Extrapolator with small 1000-Hz aiding corrections from the AJ-AIME KF (Kalman Filter) and State Error Extrapolator.

The Carrier Phase Error ($I_p Q_p = e_\phi$) coming from the discriminator, which would go into the Costas loop filter in a conventional mechanization, enters the AJ-AIME KF box. In effect, the Extrapolator and the AJ-AIME KF and State Error Extrapolator replace the Costas loop filter that conventionally closes the carrier tracking loop.

Who The AJ-AIME mechanization is really a sequence of three filters in series, each aiding the next. The AIME KF (Kalman Filter) has the slowest update rate. The rate is 1 cycle per minute, for 0.01 deg/hr navigation grade gyros, and the rate is 3 cycles per minute for missile applications with lower grade gyros of 0.1 deg/hr to 1.0 deg/hr. The measurements to this filter are the PR measurements at 1 Hz, averaged or pre-filtered over the update interval of one to three cycles per minute. Further details concerning the AIME KF can be found in U.S. Pat. No. 5,583,774 which is incorporated by reference.

The AIME KF uses PR measurements rather than phase measurements, since IMU errors such as gyro and accelerometer bias errors or reference navigation axis alignment errors, take many minutes to estimate. The error states and correlation times are shown below for both navigation grade gyros, and for lower grade gyros which might be used in missiles or munitions.

The correlation times of these navigation error sources are from ten minutes to an hour. It is best to use a measurement such as PR, which has a bounded position error over these long correlation periods. Without DGPS, the integrated carrier Doppler phase error becomes unbounded over long periods of time.

Update Rate 1/min., navigation grade gyros; 3/min, AHRS grade gyros.

Process Nose: $Q_n = 2\sigma_n^2 (1/\tau_n)$

| Group | N | Symbol | Definition | $\sigma_n$ | $1/\tau_n$ |
|---|---|---|---|---|---|
| $X_N$: (Nav) 7 | 1 | $dP_x$ | | 10 meters | 0 |
| | 2 | $dP_y$ | | 10 meters | 0 |
| | 3 | $dV_x$ | | 0.1 m/S | 0 |
| | 4 | $dV_y$ | | 0.1 m/s | 0 |
| | 5 | $d\phi_x$ | x - nav axis misalignment | 0.001 degree* | 1/hour |
| | 6 | $d\phi_y$ | y - nav axis misalignmnent | 0.001 degree* | 1/hour |
| | 7 | $d\phi_z$ | z - nav axis misalignment | 0.001 degree* | 1/hour |
| $X_I$ (Instr.) 5 | 8 | $dGB_x$ | x - gyro bias | 0.01–1.0 deg/hr** | 1/600s |
| | 9 | $dGB_y$ | y - gyro bias | 0.01–1.0 deg/hr** | 1/600s |
| | 10 | $dGB_z$ | z - gyro bias | 0.01–1.0 deg/hr** | 1/600s |
| | 11 | $dAB_x$ | x - accelerometer | 20 micro-g | 1/600s |
| | 12 | $dAB_y$ | y - accelerometer | 20 micro-g | 1/600s |
| $X_G$ (GPS) 4 | 13 | DB | User clock bias | 100 feet | 1/3600s |
| | 14 | $dB_r$ | User clock bias rate | 1 foot/sec | 1/600s |
| | 15 | $dh_B$ | Baro offset | 250 feet | 1/3600s |
| | 16 | $dh_{Bh}$ | Normalized baro offset scale factor | (1000 ft/30 K ft) · h | 1/3600s |
| $X_X$ (Sat.) 8 | 17 | $dRB_1$ | Range bias for sat. 1 | 10 meters | 1/3600s |
| | 18 | $dRB_2$ | Range bias for sat. 2 | 10 meters | 1/3600s |
| | 19 | $dRB_3$ | Range bias for sat. 3 | 10 meters | 1/3600s |
| | 20 | $dRB_4$ | Range bias for sat. 4 | 10 meters | 1/3600s |
| | 21 | $dRB_5$ | Range bias for sat. 5 | 10 meters | 1/3600s |
| | 22 | $dRB_6$ | Range bias for sat. 6 | 10 meters | 1/3600s |
| | 23 | $dRB_7$ | Range bias for sat. 7 | 10 meters | 1/3600s |
| | 24 | $dRB_8$ | Range bias for sat. 8 | 10 meters | 1/3600s |

*Gyro Random Walk: 0.001 deg/√hr
**1 deg/hr - munitions, missiles (MEMS); 0.1 deg/hr - missiles, aircraft (FOG); 0.01 deg/hr - aircraft (RLG, ZLG)

The corresponding dynamics matrix is shown below.

| | | $x_N$ | $x_I$ | $x_G$ | $x_S$ |
|---|---|---|---|---|---|
| 24 × 24 [F] | $\dot{x}_N$ | 7 × 7 $F_{NN}$ | 7 × 5 $F_{NI}$ | 0 | |
| | $\dot{x}_I$ | 0 | 5 × 5 $F_{II}$ | 0 | |
| | $\dot{x}_G$ | 0 | 0 | 4 × 3 | |

-continued

| $\dot{x}_S$ | | | | | | | $F_{GG}$ | | | |
|---|---|---|---|---|---|---|---|---|---|---|
| | | | | | | | | $8 \times 8$ $F_{SS}$ | | |

| | | $dP_x$ | $dP_y$ | $dV_x$ | $dV_y$ | $d\phi_x$ | $d\phi_y$ | $d\phi_z$ | | | |
|---|---|---|---|---|---|---|---|---|---|---|---|
| $7 \times 7$ $[F_{NN}]$ | $d\dot{P}_x$ | | | 1 | | | | | Body (B)-to-Ref (R) Direction Cosine $(D_C)$ Matrix: | | |
| | $d\dot{P}_y$ | | | | 1 | | | | | | |
| | $d\dot{V}_x$ | | | | | 0 | $-A_z$ | $+A_y$ | | | |
| | $d\dot{V}_y$ | | | | | $+A_z$ | 0 | $-A_x$ | | | |
| | $d\dot{\phi}_x$ | | $-R\omega_z$ | $-1/R$ | | 0 | $\omega_z$ | $-\omega_y$ | $3 \times 3$ $[C_B^R]$ | $C_{xx}$ $C_{yx}$ $C_{zx}$ | $C_{xy}$ $C_{yy}$ $C_{zy}$ | $C_{xz}$ $C_{yz}$ $C_{zz}$ |
| | $d\dot{\phi}_y$ | | $-R\omega_z$ | $+1/R$ | | $-\omega_z$ | 0 | $+\omega_x$ | | | |
| | $d\dot{\phi}_z$ | $+R\omega_x$ | $-R\omega_y$ | | | $+\omega_y$ | $-\omega_x$ | 0 | | | |

| | | $dGB_x$ | $dGB_y$ | $dGB_z$ | $DAB_x$ | $DAB_y$ | | | $dGB_x$ | $dGB_y$ | $dGB_z$ | $dAB_x$ | $dAB_y$ |
|---|---|---|---|---|---|---|---|---|---|---|---|---|---|
| $7 \times 5$ $[F_{NI}]$ | $d\dot{P}_x$ | | | | | | $5 \times 5$ $[F_{II}]$ | $d\dot{GB}_x$ | $-1/\tau_G$ | | | | |
| | $d\dot{P}_y$ | | | | | | | $d\dot{GB}_y$ | | $-1/\tau_G$ | | | |
| | $d\dot{V}_x$ | | | | $C_{xx}$ | $C_{xy}$ | | $d\dot{GB}_z$ | | | $-1/\tau_G$ | | |
| | $d\dot{V}_y$ | | | | $C_{yx}$ | $C_{yy}$ | | $d\dot{AB}_x$ | | | | $-1/\tau_A$ | |
| | $d\dot{\phi}_x$ | $C_{xx}$ | $C_{xy}$ | $C_{xz}$ | | | | $d\dot{AB}_y$ | | | | | $-1/\tau_A$ |
| | $d\dot{\phi}_y$ | $C_{yx}$ | $C_{yy}$ | $C_{yz}$ | | | | | | | | | |
| | $d\dot{\phi}_t$ | $C_{zx}$ | $C_{zy}$ | $C_{zz}$ | | | | | | | | | |

| | | $dB$ | $dB_r$ | $Dh_B$ | $dh_{Bh}$ |
|---|---|---|---|---|---|
| $4 \times 4$ $[F_{GG}]$ | $d\dot{B}$ | $-1/\tau_B$ | 1 | 0 | 0 |
| | $d\dot{B}_r$ | 0 | $-1/\tau_{Br}$ | 0 | 0 |
| | $d\dot{h}_B$ | 0 | 0 | $-1/\tau_{hB}$ | 0 |
| | $d\dot{h}_{Bh}$ | 0 | 0 | 0 | $-1/\tau_{hBh}$ |

| | | $dRB_1$ | $dRB_2$ | $dRB_3$ | $dRB_4$ | $dRB_5$ | $dRB_6$ | $dRB_7$ | $DRB_8$ |
|---|---|---|---|---|---|---|---|---|---|
| $8 \times 8$ $[F_{SS}]$ | $d\dot{RB}_1$ | $-1/\tau_{RB}$ | | | | | | | |
| | $d\dot{RB}_2$ | | $-1/\tau_{RB}$ | | | | | | |
| | $d\dot{RB}_3$ | | | $-1/\tau_{RB}$ | | | | | |
| | $d\dot{RB}_4$ | | | | $-1/\tau_{RB}$ | | | | |
| | $d\dot{RB}_5$ | | | | | $-1/\tau_{RB}$ | | | |
| | $d\dot{RB}_6$ | | | | | | $-1/\tau_{RB}$ | | |
| | $d\dot{RB}_7$ | | | | | | | $-1/\tau_{RB}$ | |
| | $d\dot{RB}_8$ | | | | | | | | $-1/\tau_{RB}$ |

The measurements and observation matrices are shown below.

Enroute through non-precision approx. (NPA): $dt_k = 1$ minute (60 s)

Precision Approach (PA) or missiles: $dt_k = 1/3$ minute (20 s)

$$PR_i(i) = 1/T \sum_{t=1}^{T} PR_i(t), \quad dt = 1 \text{ sec}, \quad T = dt_k$$

$$[Z'(k)]^{8 \times 1} = \begin{bmatrix} PR_1(k) \\ PR_2(k) \\ PR_3(k) \\ PR_4(k) \\ PR_5(k) \\ PR_6(k) \\ PR_7(k) \\ PR_8(k) \end{bmatrix};$$

$$[H(k)]^{8 \times 24} = \begin{bmatrix} dP_x & dP_y & & dB & & dh_B \\ e_{1x} & e_{1y} & & -1 & & e_{1z} \\ e_{2x} & e_{2y} & & -1 & & e_{2z} \\ e_{3x} & e_{3y} & & -1 & & e_{3z} \\ e_{4x} & e_{4y} & \cdots & -1 & \cdots & e_{4z} & \cdots \\ e_{5x} & e_{5y} & & -1 & & e_{5z} \\ e_{6x} & e_{6y} & & -1 & & e_{6z} \\ e_{7x} & e_{7y} & & -1 & & e_{7z} \\ e_{8x} & e_{8y} & & -1 & & e_{8z} \end{bmatrix}$$

| $dRB_1$ | $dRB_2$ | $dRB_3$ | $dRB_4$ | $dRB_5$ | $dRB_6$ | $dRB_7$ | $dRB_8$ |
|---|---|---|---|---|---|---|---|
| 1 | | | | | | | |
| | 1 | | | | | | |
| | | 1 | | | | | |
| | | | 1 | | | | |
| | | | | 1 | | | |
| | | | | | 1 | | |
| | | | | | | 1 | |
| | | | | | | | 1 |

The error state corrections x(t) are sent to the NAV computer in FIG. 1. This is done at a rate of 1 Hz, by using transition matrix extrapolation between update intervals of ⅓ to 1 minute. The NAV computer adds these slowly-varying 1-Hz corrections to the uncalibrated navigation solution based on uncalibrated IMU inputs. This is done at the navigation solution rate of 200 Hz to obtain the calibrated position output $P(t_k)$ which is sent to the AJ-AIME KF and State Error Extrapolator.

The inertial errors, low-frequency user clock errors, and low-frequency atmospheric errors have already been removed by the AIME KF. The AJ-AIME KF and State Error Extrapolator only has to estimate small, residual, high frequency errors in the signal to each satellite. These errors are the high frequency clock errors, the high frequency atmospheric anomalies and multipath errors, and the gravity anomalies. These errors each have correlation times of less than 5 minutes as shown below. As shown, the correlation time of the gravity anomaly errors is proportional to ground speed ($V_{GS}$), since the gravity anomalies vary with distance. The correlation distance is taken here to be 10 nm, rather than the usual 20 nm, since a first-order Markov model is used, rather than the second-order model of Gelb.

Update Rate: 1 Hz

Process Noise: $Q_n = 2\sigma^2_n (1/\tau_n)$

| Group | n | Symbol | Definition | $\sigma_n$ | $1/\tau_n$ |
|---|---|---|---|---|---|
| N (Nav) 6 | 1 | $\Delta P_x$ | Delta position x | 1 cm | 1/300s |
| | 2 | $\Delta P_y$ | Delta position y | 1 cm | 1/300s |
| | 3 | $\Delta P_z$ | Delta position z | 1 cm | 1/300s |
| | 4 | $\Delta V_x$ | Delta velocity x | 0.1 cm/sec | 1/300s |
| | 5 | $\Delta V_y$ | Delta velocity y | 0.1 cm/sec | 1/300s |
| | 6 | $\Delta V_z$ | Delta velocity z | 0.1 cm/sec | 1/300s |
| G (G.A., GPS) 5 | 7 | $\Delta A_x$ | Gravity anomaly x | 5 micro-g | VGS (knots)/10 nm |
| | 8 | $\Delta A_y$ | Gravity anomaly y | 5 micro-g | VGS (knots)/10 nm |
| | 9 | $\Delta A_z$ | Gravity anomaly z | 5 micro-g | VGS (knots)/10 nm |
| | 10 | $\Delta B$ | Delta user clock | 10 nano-sec | 1/300s |
| | 11 | $\Delta B_r$ | Delta user clock rate | 1 nano-sec/sec | 1/300s |
| S (Sat.) 8 | 12 | $\Delta RB_1$ | Delta range bias, sat. 1 | 1 meter | 1/60s |
| | 13 | $\Delta RB_2$ | Delta range bias, sat. 2 | 1 meter | 1/60s |
| | 14 | $\Delta RB_3$ | Delta range bias, sat. 3 | 1 meter | 1/60s |
| | 15 | $\Delta RB_4$ | Delta range bias, sat. 4 | 1 meter | 1/60s |
| | 16 | $\Delta RB_5$ | Delta range bias, sat. 5 | 1 meter | 1/60s |
| | 17 | $\Delta RB_6$ | Delta range bias, sat. 6 | 1 meter | 1/60s |
| | 18 | $\Delta RB_7$ | Delta range bias, sat. 7 | 1 meter | 1/60s |
| | 19 | $\Delta RB_8$ | Delta range bias, sat. 8 | 1 meter | 1/60s |

The corresponding dynamics matrix is shown below.

| | | $x_N$ | $x_G$ | $x_S$ |
|---|---|---|---|---|
| 19 × 19 [F] | $\dot{x}_N$ | 6 × 6 $F_{NN}$ | 6 × 5 $F_{NG}$ | |
| | $\dot{x}_G$ | | 5 × 5 $F_{GG}$ | |
| | $\dot{x}_S$ | | | 8 × 8 $F_{SS}$ |

| | | $\Delta P_x$ | $\Delta P_y$ | $\Delta P_z$ | $\Delta V_x$ | $\Delta V_y$ | $\Delta V_z$ |
|---|---|---|---|---|---|---|---|
| 6 × 6 [$F_{NN}$] | $\Delta \dot{P}_x$ | | | | 1 | 0 | 0 |
| | $\Delta \dot{P}_y$ | | | | 0 | 1 | 0 |
| | $\Delta \dot{P}_z$ | | | | 0 | 0 | 1 |
| | $\Delta \dot{V}_x$ | | | | | | |
| | $\Delta \dot{V}_y$ | | | | | | |
| | $\Delta \dot{V}_z$ | | | | | | |

| | | $\Delta A_x$ | $\Delta A_y$ | $\Delta A_z$ | $\Delta B$ | $\Delta B_r$ | | $\Delta A_x$ | $\Delta A_y$ | $\Delta A_z$ | $\Delta B$ | $\Delta B_r$ |
|---|---|---|---|---|---|---|---|---|---|---|---|---|
| 6 × 5 [$F_{NG}$] | $\Delta \dot{P}_x$ | | | | | | 5 × 5 [$F_{GG}$] | $\Delta \dot{A}_x$ | $-1/\tau_{GA}$ | | | |
| | $\Delta \dot{P}_y$ | | | | | | | $\Delta \dot{A}_y$ | | $-1/\tau_{GA}$ | | |
| | $\Delta \dot{P}_z$ | | | | | | | $\Delta \dot{A}_z$ | | | $-1/\tau_{GA}$ | |
| | $\Delta \dot{V}_x$ | 1 | 0 | 0 | | | | $\Delta \dot{B}$ | | | | $-1/\tau_{GA}$ | 1 |
| | $\Delta \dot{V}_y$ | 0 | 1 | 0 | | | | $\Delta \dot{B}_r$ | | | | 0 | $-1/\tau_{\Delta B}$ |
| | $\Delta \dot{V}_z$ | 0 | 0 | 1 | | | | | | | | |

-continued

| | | $\Delta RB_1$ | $\Delta RB_2$ | $\Delta RB_3$ | $\Delta RB_4$ | $\Delta RB_5$ | $\Delta RB_6$ | $\Delta RB_7$ | $\Delta RB_8$ |
|---|---|---|---|---|---|---|---|---|---|
| 4 × 4 [$F_{GG}$] | $\Delta RB_1$ | $-1/\tau_{\Delta RB}$ | | | | | | | |
| | $\Delta RB_2$ | | $-1/\tau_{\Delta RB}$ | | | | | | |
| | $\Delta RB_3$ | | | $-1/\tau_{\Delta RB}$ | | | | | |
| | $\Delta RB_4$ | | | | $-1/\tau_{\Delta RB}$ | | | | |
| | $\Delta RB_5$ | | | | | $-1/\tau_{\Delta RB}$ | | | |
| | $\Delta RB_6$ | | | | | | $-1/\tau_{\Delta RB}$ | | |
| | $\Delta RB_7$ | | | | | | | $-1/\tau_{\Delta RB}$ | |
| | $\Delta RB_8$ | | | | | | | | $-1/\tau_{\Delta RB}$ |

The corresponding measurement and observation matrices are shown below.

Update interval $dt_k$=1 second; $dt_m$=0.020 s (20 ms)
Transition matrix from $t_k$ to $t_m$: $\Phi(t_m-t_k)$ $$e\phi_i(k) = 1/50 \sum_{t_m=1}^{50} e\phi_i(t_m)\Phi(t_m - t_k),$$

$e\phi_i(t_m)$ = Average phase error measurement over data bit interval $$[Z(k)]^{8\times 1} = \begin{bmatrix} e\phi_1(k) \\ e\phi_2(k) \\ e\phi_3(k) \\ e\phi_4(k) \\ e\phi_5(k) \\ e\phi_6(k) \\ e\phi_7(k) \\ e\phi_8(k) \end{bmatrix};$$

$$[H(k)]^{8\times 24} = \begin{bmatrix} \Delta P_x & \Delta P_y & \Delta P_z \\ e_{1x} & e_{1y} & e_{1z} \\ e_{2x} & e_{2y} & e_{2z} \\ e_{3x} & e_{3y} & e_{3z} \\ e_{4x} & e_{4y} & e_{4z} \\ e_{5x} & e_{5y} & e_{5z} \\ e_{6x} & e_{6y} & e_{6z} \\ e_{7x} & e_{7y} & e_{7z} \\ e_{8x} & e_{8y} & e_{8z} \end{bmatrix} \begin{bmatrix} \Delta B \\ -1 \\ -1 \\ -1 \\ -1 \\ -1 \\ -1 \\ -1 \\ -1 \end{bmatrix} \ldots$$

| $\Delta RB_1$ | $\Delta RB_2$ | $\Delta RB_3$ | $\Delta RB_4$ | $\Delta RB_5$ | $\Delta RB_6$ | $\Delta RB_7$ | $\Delta RB_8$ |
|---|---|---|---|---|---|---|---|
| 1 | | | | | | | |
| | 1 | | | | | | |
| | | 1 | | | | | |
| | | | 1 | | | | |
| | | | | 1 | | | |
| | | | | | 1 | | |
| | | | | | | 1 | |
| | | | | | | | 1 |

It is assumed here that the body mounted IMU axes lie along the principal (eigenvector) axes of the moment of inertia tensor of the aircraft or missile, and that the autopilot controls the angular rates, $\omega_x$, $\omega_y$, $\omega_z$ about these axes. The angular rates and angular accelerations can then be predicted a short time $t_p$ into the future at 1000 Hz by the body axis extrapolator shown in FIG. 2. This prediction time is necessary because of the time lag in rotating the carrier phase in the Carrier NCO shown in FIG. 1. If the phase is rotated at constant rate every 5 milliseconds, the prediction time must be at least 5 milliseconds. If the phase is rotated at a changing rate every millisecond, the prediction time must be at least 1 millisecond. The sampling switch at interval $T_k$ shown in FIG. 2 is also necessary when IMU measurements are asynchronous with the Carrier NCO.

It is also assumed that the autopilot controls the acceleration along body axes, by controlling lift and thrust forces. The linear accelerations are also predicted as shown by the dV Predictor in FIG. 2.

Figure 2:
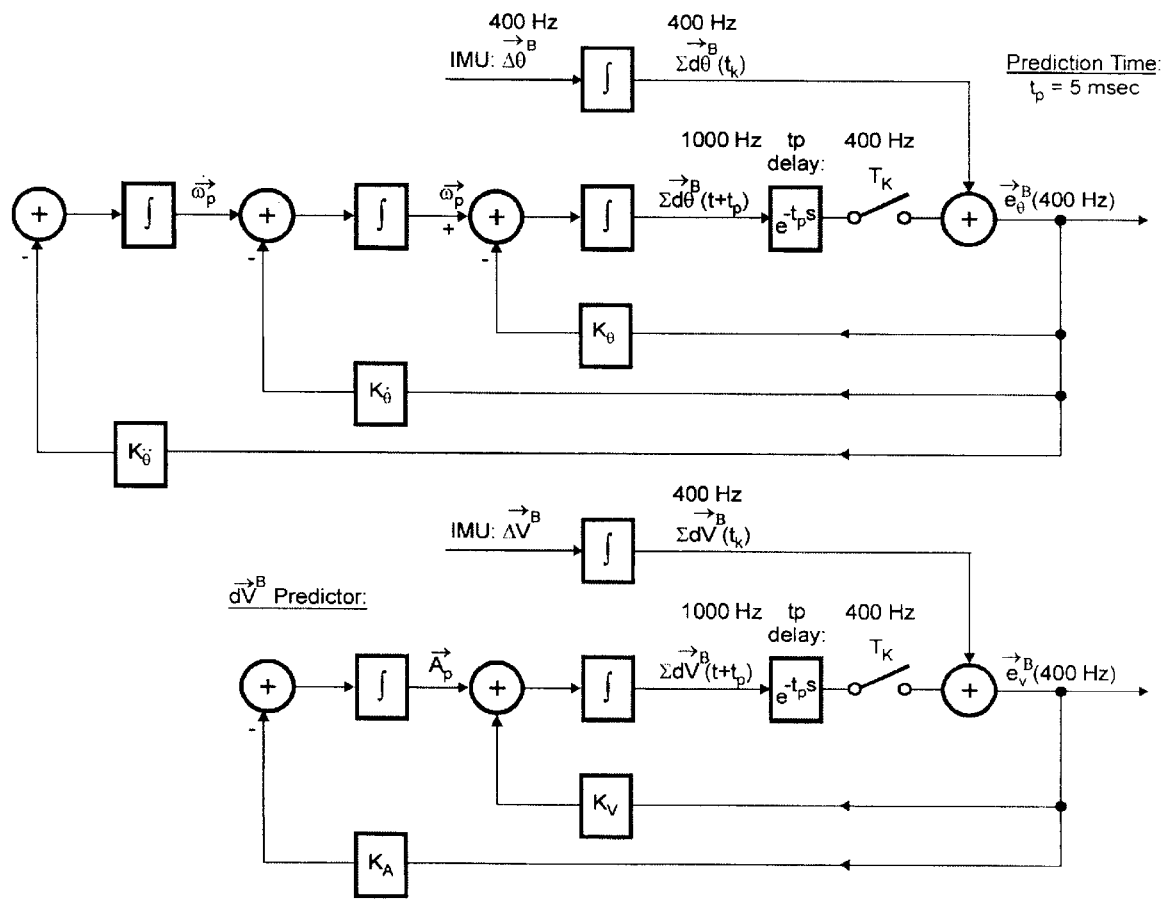
FIG. 2 shows an embodiment of that portion of the invention that transforms present and past IMU acceleration and angular velocity into estimates of future values of IMU acceleration and angular velocity.

The rate of change of angular acceleration, called angular "jerk", is not estimated by the body axis extrapolator of FIG. 2. Using as an example a 1-foot lever arm from the center of mass to the GPS antenna, a maximum antenna jerk of 10 g's/sec would result from an angular jerk of 320 radian/sec$^2$ per second. This would be typical of a low performance aircraft or missile. A maximum jerk of 100 g's per second, resulting from 3200 rad/sec$^2$ per sec, would be typical for high performance aircraft or missiles. A jerk of 1000 g's per second, resulting from 32,000 radians/sec$^2$ per second, would be typical for many munitions.

With 1-foot lever arm, the 1000 g/sec jerk resulting from 32,000 rad/sec$^3$ is the same as 32,000 feet/sec$^3$. This is approximately 10,000 meters/sec$^3$, which is 0.010 millimeter/millisecond$^3$. The maximum phase displacement with prediction time 5 milliseconds is 0.2083333 mm, obtained from (0.010 mm/ms$^3$)×(5ms)$^3$/6.

Similar results apply to the linear acceleration predictor in FIG. 2. Although 1000 g's/sec seems quite large, it corresponds to changing the acceleration by 10 g's in 0.01 seconds, or by 100 g's in 0.1 second. Angular acceleration jerks about the roll axis are sometimes larger than linear acceleration jerks. Larger jerks can be accommodated by increasing the angular measurement rate from the IMU from 400 Hz to 1600 Hz, and by reducing the constant phase rate rotation interval in the Carrier NCO to 1 millisecond.

Since the phase angle and velocity increments in FIG. 2 are in body axes, they must be converted to position along the line-of-sight (LOS) in order to rotate the phase of the Carrier NCO. This is done by the algorithm shown below.

Define:

$$\Delta \theta^B]^{3\times 1} = \sum_{t=t_k}^{t+t_p} d\theta^B(t);$$

$dt_k$=5 ms (200 Hz)

Body-to-Reference Direction Cosine (DC) Matrix $$[C_B^R(t+t_p)]^{3\times 3} = \begin{bmatrix} 1 & -\Delta\theta_z & +\Delta\theta_y \\ \Delta\theta_z & 1 & -\Delta\theta_x \\ -\Delta\theta_y & +\Delta\theta_x & 1 \end{bmatrix} \cdot [C_B^R(t_k)]^{3\times 3}$$

Body Axes:

$$dV^B(t+t_p)]^{3\times 1} = \sum_{t=t_k}^{t+t_p} dV^B(t+t_p)]^{3\times 3} - \sum_{t=t_k}^{t+t_{p-1}} dV^B(t+t_p)]^{3\times 1}$$

Reference (NAV) axes:

$$dV^R(t+t_p)]^{3\times 1} = [C_B^R(t+t_p) \cdot dV^B(t+t_p)]^{3\times 3 \quad 3\times 1}$$

1000 Hz:

$$\Delta P^R(t+t_p)]^{3\times 1} = \sum_{t+t_k}^{t+t_p} dV(t+t_p)^{3\times 1}, \, dt_k = 5 \text{ ms}(200 \text{ Hz})$$

The first step is to determine the direction cosine (DC) matrix from body (B) to navigation reference (R) axes at the predicted time $t+t_p$. This is accomplished by accumulating angular increments along body axes from the last navigation solution at time $t_k$ to the predicted time $t+t_p$. Using small angle approximations, the DC matrix at the last navigation solution time $t_k$ is then rotated through the accumulated angle $\Delta\phi^B$ to obtain an approximate DC matrix $[C_B^R(t+t_p)]$ at 1000 Hz. This matrix is then used to convert the last $dV^B$ increment at time $t+t_p$ to navigation reference axis increment $dV^R(t+t_p)$ at 1000 Hz. These increments along navigation reference axes are accumulated to obtain delta position of the IMU from last navigation solution time $t_k$ to predicted time $t+t_p$.

By adding these positions, the total position of the IMU is obtained. It remains to add the relative position of the GPS antenna due to the lever arm vector $R_L^B$] from the IMU to the GPS antenna. Although $R_L^B$] is fixed in body axes, it must be resolved along navigation reference axes, as was $d_V^B$]. The resulting position is then resolved along the LOS to each satellite, using the slowly varying satellite LOS direction cosines $e_i$] relative to the navigation reference axes. These direction cosines are already computed from the navigation filter at 1 Hz.

Because of the aiding from the slow (3 per minute) AIME™ KF to the fast (1 Hz) AJ-AIME KF and the aiding from this fast Kalman filter (1 Hz) to the Extrapolator (1000 Hz), positions computed at different rates are being added. In order to provide continuous 1000 Hz phase, it is necessary to low-pass filter each aiding position and to sample at a much higher rate before adding to the faster filter at each level.

Since only relative change in phase is needed, the positions are periodically reduced by an No amount corresponding to the change since the last slow computer time $t_k$ to time $t+t_p$, and only the position change is resolved along the LOS to add to the phase at the last computer time $t_k$. Whenever the position is reduced, the low pass filter for that position is reduced by the same amount, in order that the filter output is continuous. In addition, the phase is reduced by the phase at the last slow computer time $t_k$. Since the phase is computed in fractions of a revolution, modulus-1 revolution, the change in phase is computed correctly, even though the total accumulated phase never exceeds one revolution.

What is claimed is:

1. A method for adjusting the phase and frequency of a received GPS signal in an inertial-GPS navigation system comprising an inertial measurement unit (IMU) and a GPS receiver, the GPS receiver having an input port for inputting a delta-phase at delta-time intervals into a received satellite signal, the GPS receiver having an output port for outputting a carrier phase error, the carrier phase error being the difference between the actual phase of the received GPS signal and a reference value, the GPS receiver having an output port for outputting a pseudorange associated with the received GPS signal, the IMU having an output port for outputting acceleration and angular velocity of the IMU, the delta-phase being the sum of at least two delta-phase components, the method comprising the step:

(a) determining a Kalman delta-phase component, a plurality of candidate Kalman delta-phase components being obtained by performing a first set of more than one Kalman filter processes, the inputs to each first-set Kalman filter process including the carrier phase error and a position vector associated with the IMU, a candidate Kalman delta-phase component being produced as an output of each first-set Kalman filter process, the Kalman delta-phase component being determined from a candidate Kalman delta-phase components selected from the plurality of candidate Kalman delta-phase components by applying a predetermined Kalman delta-phase component selection rule;

(b) determining an IMU delta-phase component from the IMU outputs and a direction-cosine matrix that translates the body coordinates of the IMU into the navigation coordinates of the inertial-GPS navigation system.

2. The method of claim 1 wherein step (a) comprises the step:

(a1) identifying the present value of the Kalman delta-phase component with a future value of the selected candidate delta-phase component.

3. The method of claim 1 wherein step (a) comprises the steps:

(a1) obtaining a plurality of candidate error-state vectors by performing a second set of more than one Kalman filter processes, a candidate error-state vector being produced as an output of each second-set Kalman filter process utilizing a plurality of prior pseudorange values and the present position vector;

(a2) selecting the error-state vector from the candidate error-state vectors by applying a predetermined error-state vector selection rule;

(a3) determining the position vector using IMU outputs and the error-state vector.

4. The method of claim 3 wherein in step (a1) each Kalman filter process in the second set is tuned to recognize either (1) the absence of any failure conditions or (2) the presence of a particular failure condition, a failure condition being the failure of a group of one or more functional elements of the inertial-GPS navigation system to perform within specifications.

5. The method of claim 3 wherein in step (a2) the selected error-state vector is the error-state vector produced by the Kalman filter process producing a value of a failure-condition quantity that is statistically distinguishable from the values of the failure-condition quantity produced by the other second-set Kalman filter processes.

6. The method of claim 5 whereby the failure-condition quantity is derived from weighted residuals summed over a plurality of Kalman filter process update cycles.

7. The method of claim 1 wherein step (b) comprises the steps:

(b1) estimating future values of IMU acceleration and angular velocity from the IMU outputs;

(b2) translating the future values of IMU acceleration and angular velocity into the IMU delta-phase component utilizing the direction-cosine matrix that translates the body, coordinates of the IMU into the navigation coordinates of the inertial-GPS navigation system.

8. The method of claim 7 wherein step (b2) comprises the steps:

(b2-1) obtaining a plurality of candidate error-state vectors by performing a second set of more than one Kalman filter processes, a candidate error-state vector being produced as an output of each second-set Kalman filter process utilizing a plurality of prior pseudorange values and the present position vector;

(b2-2) selecting the error-state vector from the candidate error-state vectors by applying a predetermined error-state vector selection rule;

(b2-3) determining the direction-cosine matrix using [MU outputs and the error-state vector.

9. The method of claim 8 wherein in step (b2-1) each Kalman filter process in the second set is tuned to recognize either (1) the absence of any failure conditions or (2) the presence of a particular failure condition, a failure condition being the failure of a group of one or more functional elements of the inertial-GPS navigation system to perform within specifications.

10. The method of claim 8 wherein in step (b2-2) the selected error-state vector is the error-state vector produced by the Kalman filter process producing a value of a failure-condition quantity that is statistically distinguishable from the values of the failure-condition quantity produced by the other second-set Kalman filter processes.

11. The method of claim 10 whereby the failure-condition quantity is derived from weighted residuals summed over a plurality of Kalman filter process update cycles.

12. Apparatus for adjusting the phase and frequency of a received GPS signal in an inertial-GPS navigation system comprising an inertial measurement unit (IMU) and a GPS receiver, the GPS receiver having an input port for inputting a delta-phase at delta-time intervals into a received satellite signal, the GPS receiver having an output port for outputting a carrier phase error, the carrier phase error being the difference between the actual phase of the received GPS signal and a reference value, the GPS receiver having an output port for outputting a pseudorange associated with the received GPS signal, the IMU having an output port for outputting acceleration and angular velocity of the IMU, the delta-phase being the sum of at least two delta-phase components, the apparatus comprising:

(a) a processor for determining a Kalman delta-phase component, a plurality of candidate Kalman delta-phase components being obtained by performing a first set of more than one Kalman filter processes, the inputs to each first-set Kalman filter process including the carrier phase error and a position vector associated with the IMU, a candidate Kalman delta-phase component being produced as an output of each first-set Kalman filter process, the Kalman delta-phase component being determined from a candidate Kalman delta-phase components selected from the plurality of candidate Kalman delta-phase components by applying a predetermined Kalman delta-phase component selection rule;

(b) a processor for determining an IMU delta-phase component from the IMU outputs and a direction-cosine matrix that translates the body coordinates of the IMU into the navigation coordinates of the inertial-GPS navigation system.

13. The apparatus of claim 12 wherein processor (a) includes:

(a1) a means for identifying the present value of the Kalman delta-phase component with a future value of the selected candidate delta-phase component.

14. The apparatus of claim 12 wherein processor (a) includes:

(a1) a means for obtaining a plurality of candidate error-state vectors by performing a second set of more than one Kalman filter processes, a candidate error-state vector being produced as an output of each second-set Kalman filter process utilizing a plurality of prior pseudorange values and the present position vector;

(a2) a means for selecting the error-state vector from the candidate error-state vectors by applying a predetermined error-state vector selection rule;

(a3) a means for determining the position vector using IMU outputs and the error-state vector.

15. The apparatus of claim 14 wherein each Kalman filter process in the second set is tuned to recognize either (1) the absence of any failure conditions or (2) the presence of a particular failure condition, a failure condition being the failure of a group of one or more functional elements of the inertial-GPS navigation system to perform within specifications.

16. The apparatus of claim 14 wherein the selected error-state vector is the error-state vector produced by the Kalman filter process producing a value of a failure-condition quantity that is statistically distinguishable from the values of the failure-condition quantity produced by the other second-set Kalman filter processes.

17. The apparatus of claim 16 whereby the failure-condition quantity is derived from weighted residuals summed over a plurality of Kalman filter process update cycles.

18. The apparatus of claim 12 wherein processor (b) includes:

(b1) a means for estimating future values of IMU acceleration and angular velocity from the IMU outputs;

(b2) a means for translating the future values of IMU acceleration and angular velocity into the IMU delta-phase component utilizing the direction-cosine matrix that translates the body coordinates of the IMU into the navigation coordinates of the inertial-GPS navigation system.

19. The apparatus of claim 18 wherein processor (b) includes:

(b2-1) a means for obtaining a plurality of candidate error-state vectors by performing a second set of more than one Kalman filter processes, a candidate error-state vector being produced as an output of each second-set Kalman filter process utilizing a plurality of prior pseudorange values and the present position vector;

(b2-2) a means for selecting the error-state vector from the candidate error-state vectors by applying a predetermined error-state vector selection rule;

(b2-3) a means for determining the direction-cosine matrix using IMU outputs and the error-state vector.

20. The apparatus of claim 19 wherein each Kalman filter process in the second set is tuned to recognize either (1) the absence of any failure conditions or (2) the presence of a particular failure condition, a failure condition being the failure of a group of one or more functional elements of the inertial-GPS navigation system to perform within specifications.

21. The apparatus of claim 19 wherein the selected error-state vector is the error-state vector produced by the Kalman filter process producing a value of a failure-condition quantity that is statistically distinguishable from the values of the failure-condition quantity produced by the other second-set Kalman filter processes.

22. The apparatus of claim 21 wherein the failure-condition quantity is derived from weighted residuals summed over a plurality of Kalman filter process update cycles.

* * * * *